(12) United States Patent
Osawa

(10) Patent No.: US 9,478,921 B2
(45) Date of Patent: Oct. 25, 2016

(54) CHARGING INLET

(71) Applicant: Sumitomo Wiring Systems, Ltd., Yokkaichi, Mie (JP)

(72) Inventor: Kiyoshi Osawa, Mie (JP)

(73) Assignee: SUMITOMO WIRING SYSTEMS, LTD., Yokkaichi (JP)

( * ) Notice: Subject to any disclaimer, the term of this patent is extended or adjusted under 35 U.S.C. 154(b) by 0 days.

(21) Appl. No.: 14/717,053

(22) Filed: May 20, 2015

(65) Prior Publication Data

US 2015/0364877 A1 Dec. 17, 2015

(30) Foreign Application Priority Data

Jun. 11, 2014 (JP) .................. 2014-120350

(51) Int. Cl.
| | | |
|---|---|---|
| H01R 33/00 | (2006.01) | |
| H01R 13/74 | (2006.01) | |
| H01R 13/42 | (2006.01) | |
| B60L 11/18 | (2006.01) | |
| H01R 13/512 | (2006.01) | |
| H01R 13/436 | (2006.01) | |

(52) U.S. Cl.
CPC ......... *H01R 13/748* (2013.01); *B60L 11/1818* (2013.01); *H01R 13/42* (2013.01); *H01R 13/512* (2013.01); *H01R 13/4367* (2013.01); *H01R 2201/26* (2013.01)

(58) Field of Classification Search
CPC .............. H01R 2201/26; H01R 13/74; H01R 2107/00
See application file for complete search history.

(56) References Cited

U.S. PATENT DOCUMENTS

| | | | | |
|---|---|---|---|---|
| 8,257,101 B2* | 9/2012 | Ichio | .................. | H01R 13/4367 439/206 |
| 8,597,039 B2 | 12/2013 | Osawa | | |
| 8,662,910 B2* | 3/2014 | Ichio | .................. | H01R 13/5208 439/206 |
| 8,827,731 B2* | 9/2014 | Sasaki | ................. | B60L 11/1818 439/206 |
| 8,956,190 B2* | 2/2015 | Natter | .................... | B60L 3/0069 439/34 |
| 9,150,172 B2* | 10/2015 | Matsuda | ................. | B60L 11/18 |
| 2015/0343914 A1* | 12/2015 | Osawa | ................ | B60L 11/1818 439/205 |

\* cited by examiner

*Primary Examiner* — Xuong Chung Trans
(74) *Attorney, Agent, or Firm* — Gerald E. Hespos; Michael J. Porco; Matthew T. Hespos

(57) ABSTRACT

A charging inlet (10) includes an inlet housing (20) with a fastened portion (24, 35). A terminal accommodating portion (32A to 32C, 42A, 42B) is provided in the inlet housing (20) and a vehicle-side terminal is accommodated therein. A fastening member (25) is fastened to the fastened portion (24, 35). A retainer includes a retainer body that is locked to the vehicle-side terminal and a fixed portion (72, 82) that is disposed between the fastening member (25) and the fastened portion (24, 35) and is fixed to the inlet housing (20).

5 Claims, 11 Drawing Sheets

CHARGING INLET

BACKGROUND

1. Field of the Invention

The technology disclosed herein relates to a charging inlet.

2. Description of the Related Art

U.S. Pat. No. 8,597,039 discloses a conventional vehicle-side connector that is fit to a charging connector when charging the battery of a vehicle. The vehicle-side connector includes a mounting portion that is mounted fixedly to the body of the vehicle, and a substantially cylindrical terminal accommodating portion extends though the mounting portion in the front-rear direction. Cavities extend through the terminal accommodating portion in the front-rear direction and accommodate vehicle-side terminal fittings. A rearward protruding portion protrudes from the rear of the mounting portion, and a retainer can be mounted to the rearward protruding portion from the rear to retain the vehicle-side terminal fittings. The retainer includes a retainer body that is locked to the vehicle-side terminal fittings from the rear, and claw-shaped locks are cantilevered forward from the peripheral edge of the retainer body. The claw-shaped locks catch on projections on the outer peripheral surface of the rearward protruding portion. Short locks may not catch on the projections. Thus, retainer body may lock the vehicle-side terminal fitting from the rear, but the retainer may detach from the rearward protruding portion so that retention by the retainer body cannot be achieved. Accordingly, it is necessary to lengthen the locks to catch the locks on the projections after retaining the vehicle-side terminal fittings by the retainer body. However, longer locks prevent a reduction of the overall profile of the vehicle-side connector.

SUMMARY OF THE INVENTION

A charging inlet disclosed herein includes a retainer and a vehicle-side terminal retained by the retainer. The charging inlet includes an inlet housing with a fastened portion. A terminal accommodating portion is provided in the inlet housing and the vehicle-side terminal is accommodated therein. A fastening member that is fastened to the fastened portion. The retainer includes a retainer body that is locked to the vehicle-side terminal, and a fixed portion between the fastening member and the fastened portion is fixed to the inlet housing.

The fixed portion is fixed to the inlet housing by fastening the fastening member to the fastened portion. In other words, the retainer is fixed to the inlet housing by fastening the fastening member, and therefore there will be no need for a conventional claw-shaped long lock so that the overall profile of the charging inlet can be reduced.

The retainer body may lock the vehicle-side terminal in the same direction that the fastening member is fastened to the fastened portion. With this configuration, the vehicle-side terminal is locked by the retainer body as a result of the fastening member being fastened to the fastened portion. Here, depending on the form tolerance between the inlet housing and the retainer, two cases are possible. First, fastening of the fastening member is completed in a state where the retainer body abuts against the vehicle-side terminal. Second, the fastening of the fastening member is completed in a state where the fixed portion abuts against the fastened portion. In either case, the retainer is fixed to the inlet housing, and there is no need for the fixed portion to be larger in consideration of the above-described form tolerance.

A plurality of peripheral walls disposed around the retainer body may stand upright on a back of the inlet housing, and a plurality of contact pieces respectively coming into contact with the plurality of peripheral walls from a side of the terminal accommodating portion may be provided at a peripheral edge of the retainer body.

With this configuration, the retainer can be positioned at the inlet housing to bring the contact pieces into contact with the peripheral walls. A conventional charging inlet positions the retainer by fitting the claw-shaped lock portion along the outer peripheral surface of the terminal accommodating portion. However, the charging inlet disclosed herein brings the contact pieces into contact with the peripheral walls, a fixing method using the fastening member can achieve the positioning in the same manner as the conventional method.

The contact pieces may include a contact piece projecting towards one of the peripheral walls with the fixed portion as a starting point. With this configuration, the fixed portion and the peripheral wall are connected directly with the contact piece, thereby increasing the accuracy of positioning the fixed portion at the fastened portion.

The contact pieces may be spaced 90° apart around the terminal accommodating portion. With this configuration, the retainer body can be positioned from directions that differ by 90° around the terminal accommodating portion. As a result, the accuracy of positioning the fixed portion at the fastened portion can be increased.

The charging inlet may include a coupling wall that couples an adjacent pair of the peripheral walls. With this configuration, the peripheral walls can be formed integrally by the coupling wall, thereby increasing the strength of the peripheral walls.

According to the technology disclosed herein, it is possible to reduce the profile of a charging inlet.

DETAILED DESCRIPTION

Figure 1:
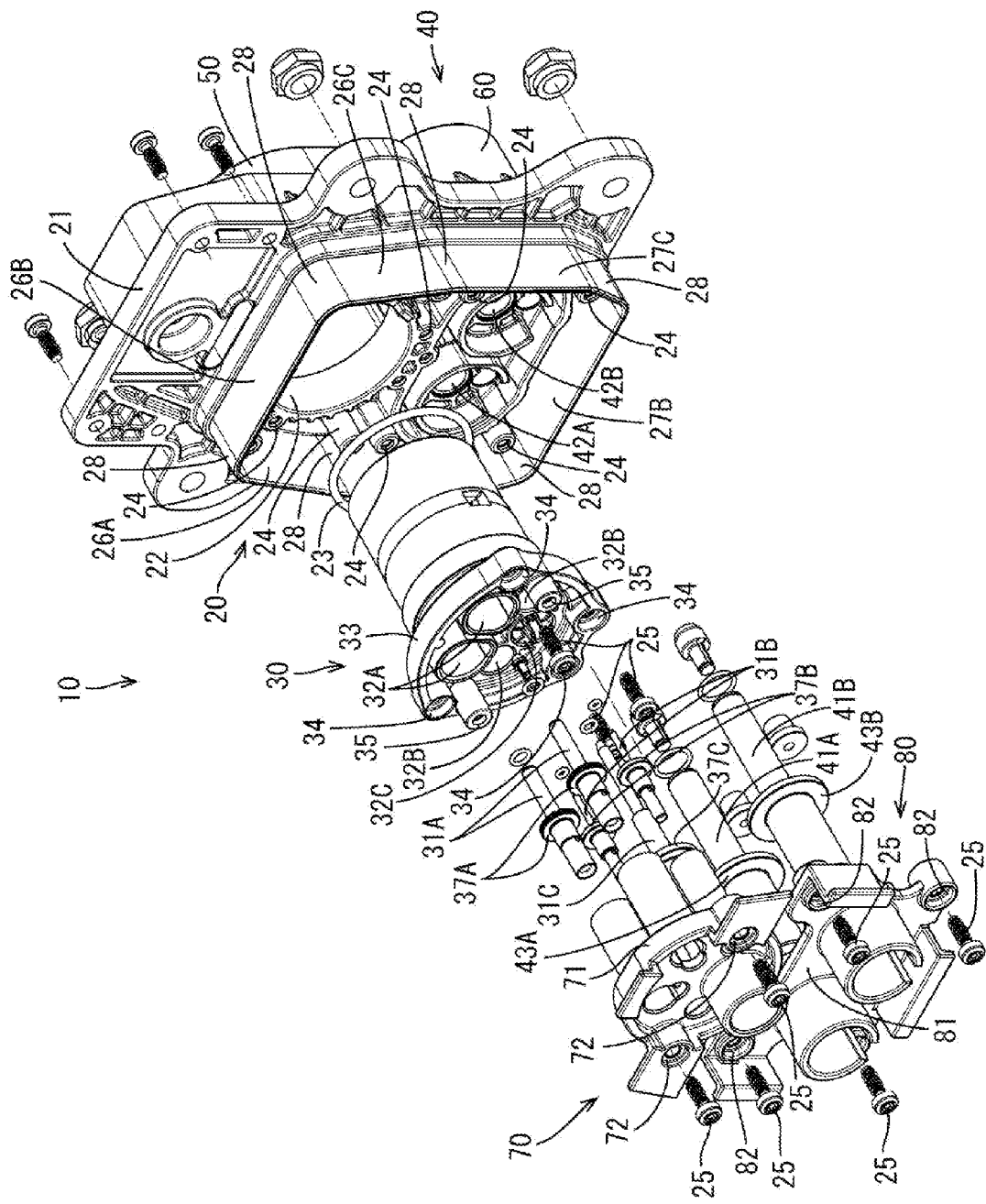
FIG. 1 is an exploded perspective view showing components of a charging inlet according to an embodiment, as viewed obliquely from the rear.
Figure 2:
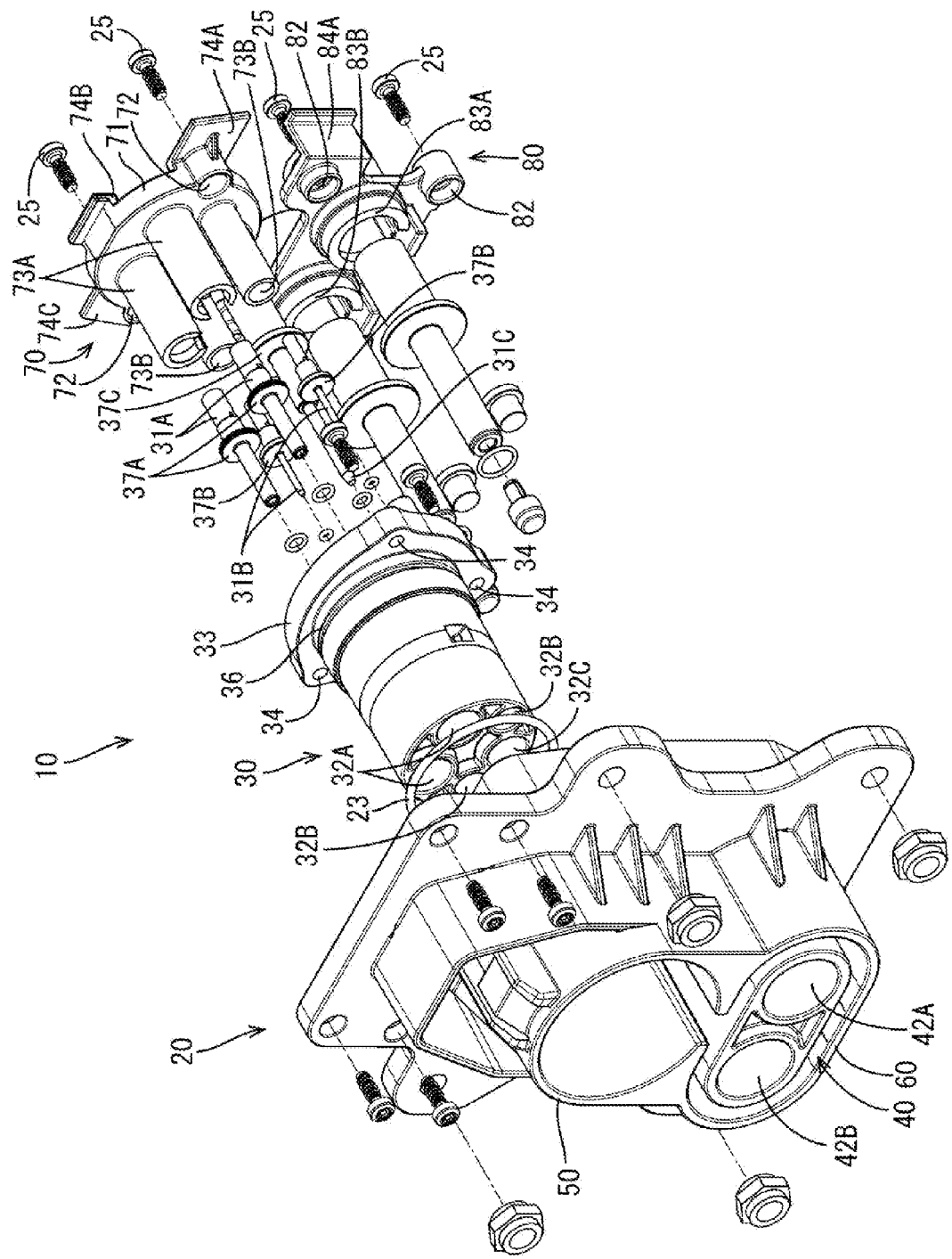
FIG. 2 is an exploded perspective view showing components of the charging inlet, as viewed obliquely from the front.

A charging inlet according to an embodiment is identified by the number 10 in FIGS. 1 and 2. As shown in FIG. 2, the charging inlet 10 includes an inlet housing 20 with first and second connector fittings 30 and 40. First terminals 31A to 31C are mounted to the first connector fitting 30, and second terminals 41A and 41B are mounted to the second connector fitting 40. A first retainer 70 retains the first terminals 31A to 31C and a second retainer 80 retains the second terminals 41A and 41B.

The charging inlet 10 is a vehicle-side connector that is mounted to a vehicle such as an electric car or a hybrid car, and is used for charging the battery installed on the vehicle. Charging the battery is performed by connecting a feeding-side connector disposed at a feeding facility to the vehicle-side connector from the front. Further, the charging inlet 10 is in compliance with the "Combined Charging System (CCS system)" in which a normal charging portion and a fast charging portion are integrated. In the present embodiment, the first connector fitting 30 corresponds to the normal charging portion, and the second connector fitting 40 corresponds to the fast charging portion. The first terminals 31A to 31C and the second terminal 41A and 41B are vehicle-side terminals that are connected to wires in the vehicle side. In the following description, it is assumed that the side of the fitting surface of the charging inlet 10 with the feeding-side connector is the front side.

The inlet housing 20 is made of a synthetic resin, and includes a mounting plate 21 that is mounted and bolted to the body of a vehicle, as shown in FIGS. 1 and 2. First and second hoods 50 and 60 protrude forward from the mounting plate 21. The mounting plate 21 projects out from outer peripheral surfaces of both the first and second hoods 50 and 60 to extend continuously around the entire perimeter.

Figure 9:
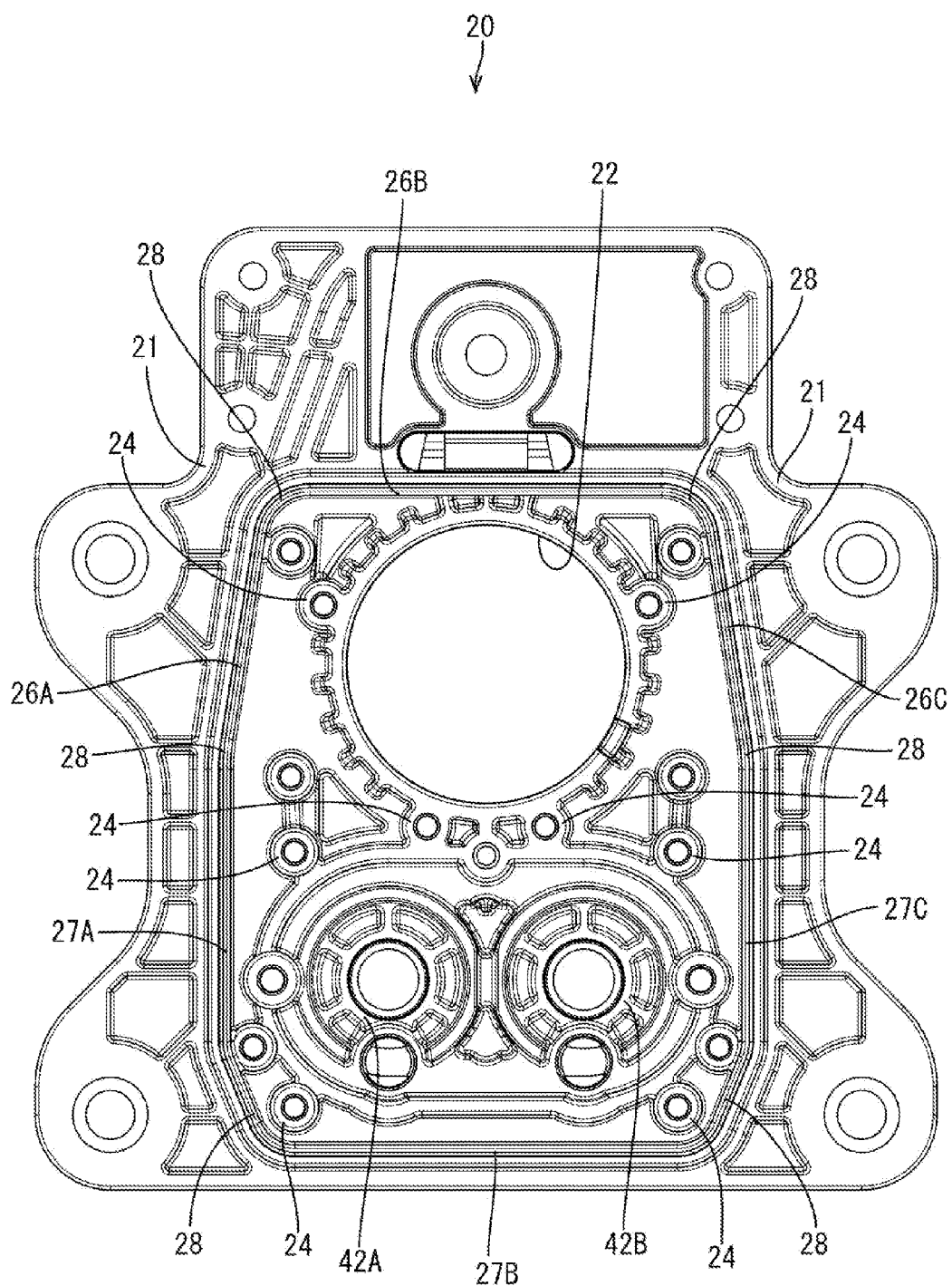
FIG. 9 is a rear view of an inlet housing.

The first hood 50 has a circular cylindrical shape as viewed from the front, whereas the second hood 60 has a horizontally elongated, oval tubular shape as viewed from the front. The first hood 50 is provided above and continuously with the second hood 60. Further, as shown in FIG. 9, a mounting hole 22 for mounting the first connector fitting 30, which is formed separately from the mounting plate 21 of the inlet housing 20, is formed through the mounting plate 21 in the front-rear direction.

The first connector fitting 30 is made of a synthetic resin and has an outer peripheral surface with a right circular shape as viewed from the front, as shown in FIG. 2. A mounting groove 36 is provided around the outer peripheral surface of the first connector 30 and an O-ring 23 is mounted therein. The first connector fitting 30 is inserted into the mounting hole 22 of the inlet housing 20 from the rear and is mounted fixedly to the mounting plate 21 with the O-ring 23 sandwiched between the inner peripheral surface of the mounting hole 22 and the outer peripheral surface of the first connector fitting 30 for sealing the inside of the vehicle.

Figure 8:
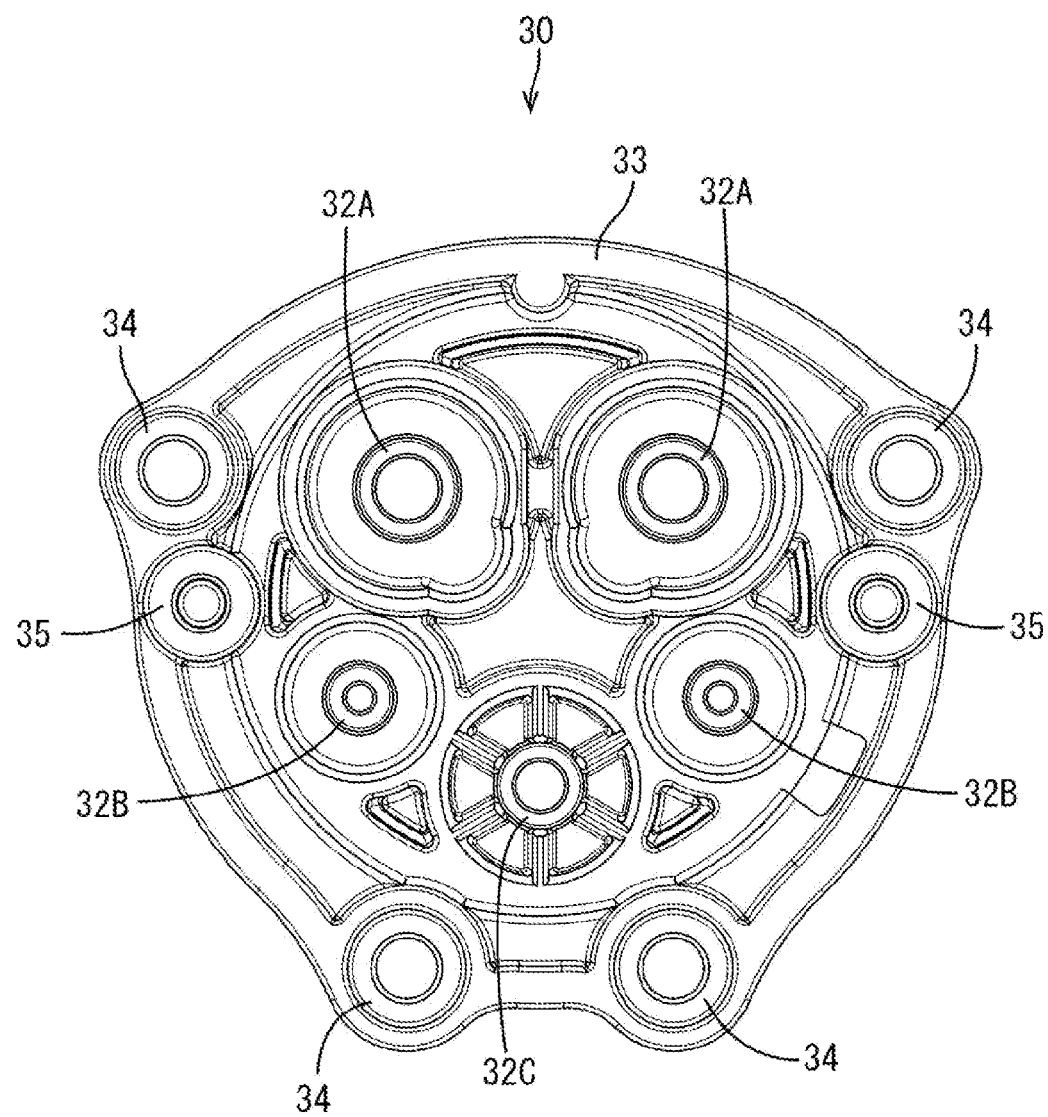
FIG. 8 is a rear view of a first connector fitting portion.

As shown in FIG. 8, first terminal accommodating portions are formed in the first connector fitting 30 for receiving first terminals. Specifically, the first terminals include two upper first terminals 31A disposed at an upper part, two middle first terminals 31B disposed at a middle part, and a lower first terminal 31C disposed at a lower part. Likewise, the first terminal accommodating portions are made up of upper first terminal accommodating portions 32A in which the upper first terminals 31A are accommodated, middle first terminal accommodating portions 32B in which the middle first terminals 31B are accommodated, and a lower first terminal accommodating portion 32C in which the lower first terminal 31C is accommodated. The first retainer 70 is mounted to the first connector fitting 30 from the rear after the first terminals 31A to 31C are inserted into the first terminal accommodating portions 32A to 32C for collectively retaining the first terminals 31A to 31C.

As shown in FIG. 2, the second connector fitting 40 has a horizontally elongated oblong shape as viewed from the front. As shown in FIG. 9, second terminal accommodating portions are formed in the second connector fitting 40 and accommodate second terminals. Specifically, the second terminals are made up of a left second terminal 41A disposed on the left as viewed from the front, and a right second terminal 41B disposed on the right as viewed from the front. Likewise, the second terminal accommodating portions are made up of a left second terminal accommodating portion 42A in which the left second terminal 41A is accommodated and a right second terminal accommodating portion 42B in which the right second terminal 41B is accommodated. The second retainer 80 is mounted to the mounting plate 21 of the inlet housing 20 from the rear after the second terminals 41A and 41B are inserted into the second terminal accommodating portions 42A and 42B, thereby collectively retaining the second terminals 41A and 41B.

As shown in FIG. 8, a flange 33 is provided on the outer peripheral surface of the first connector fitting 30, and is provided with bolt-fastening seats 34. More particularly, two bolt-fastening seats 34 are disposed on the left and right sides of the upper first terminal accommodating portions 32A two bolt-fastening seats 34 are disposed below the upper first terminal accommodating portions 32A.

Figure 10:
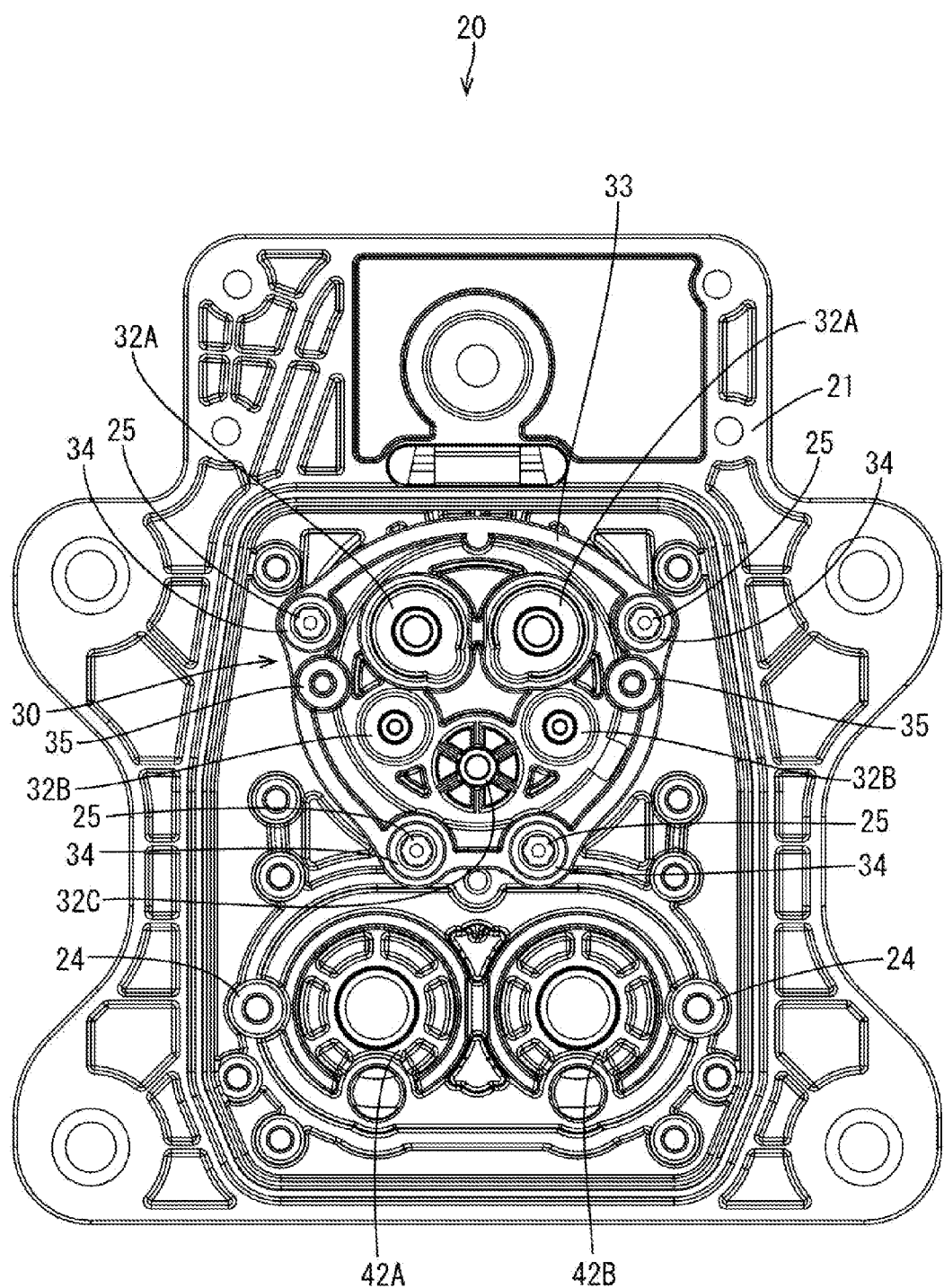
FIG. 10 is a rear view showing a state in which the first connector fitting portion is fixedly mounted to the inlet housing shown in FIG. 9.

As shown in FIG. 9, fastened portions 24 are provided at the mounting plate 21 of the inlet housing 20. The fastened portions 24 are disposed on the back of the mounting plate 21 in correspondence with the bolt-fastening seats 34 in the front-rear direction. The fastened portions 24 correspond to nuts to which fastening members 25, which are illustrated as bolts in FIG. 1, are fastened. The fastening members 25 are inserted through the bolt-fastening seats 34 and fastened to the fastened portions 24 after the first connector fitting 30 is inserted into the mounting hole 22 from the rear so that the bolt-fastening seats 34 coincide with the fastened portions 24. Consequently, as shown in FIG. 10, the four bolt-fastening seats 34 shown in the drawing are fixed respectively to the four fastened portions 24 by the four fastening members 25, as shown in the drawing. Thus, the first connector fitting 30 is mounted fixedly to the mounting plate 21 of the inlet housing 20. Two fastened portions 35 are provided directly below bolt-fastening seats 34 at an upper part and the fastening members 25 are fastened thereto. The fastened portions 35 correspond to nuts to which the fastening members 25 are fastened when fixing the first retainer 70 to the first connector fitting 30.

Figure 3:
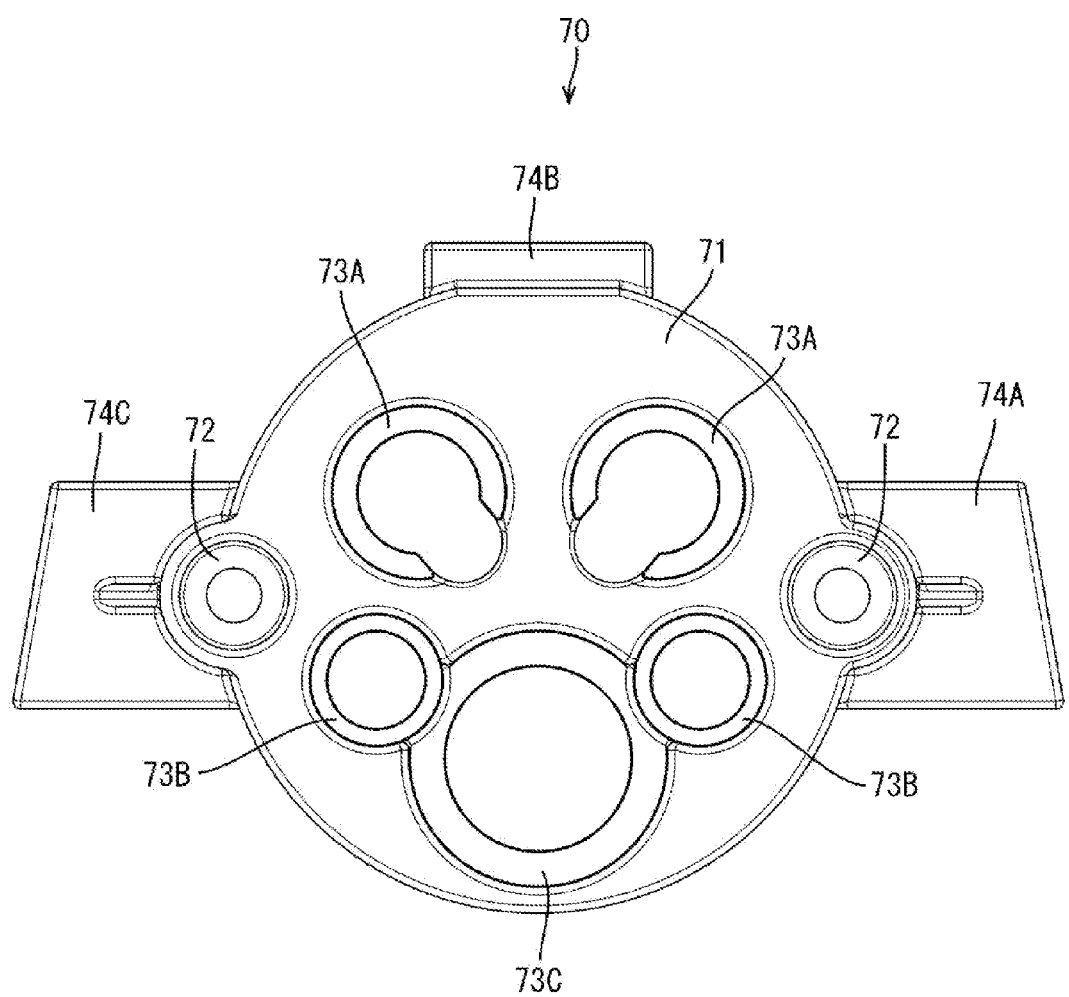
FIG. 3 is a front view of a first retainer.
Figure 4:
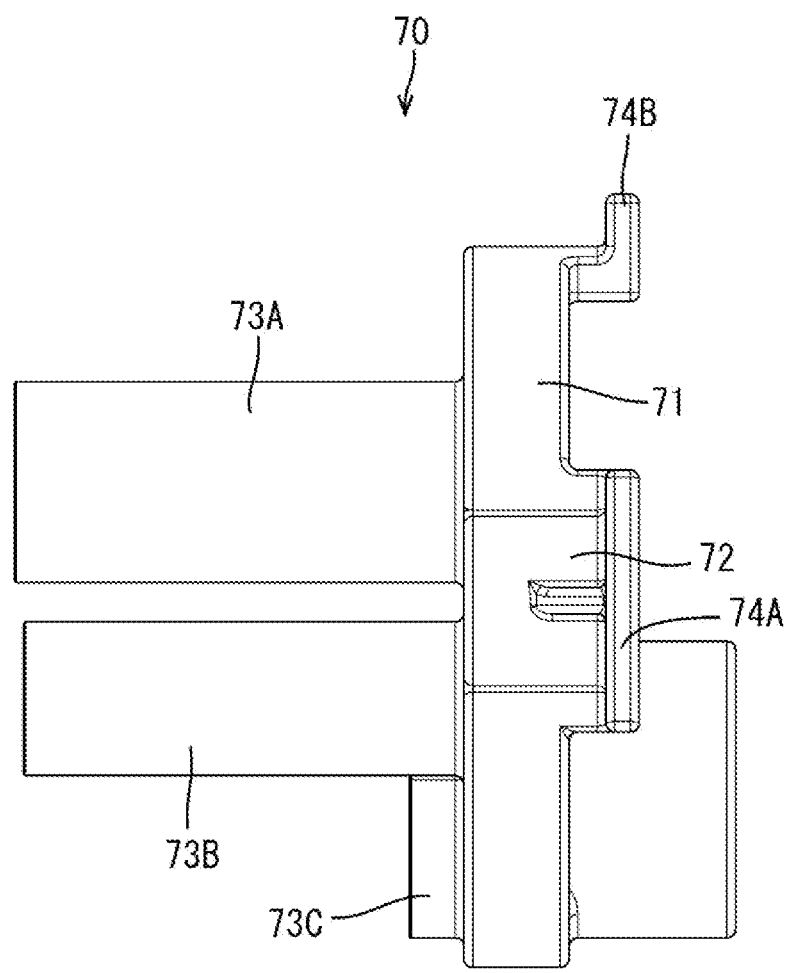
FIG. 4 is a side view of the first retainer.

As shown in FIGS. 3 and 4, the first retainer 70 includes a first retainer body 71 that collectively retains the first terminals 31A to 31C, and first fixed portions 72 through which fastening members 25 are inserted. The first retainer body 71 is provided with first locking tubes that are inserted into the terminal accommodating portions 32A to 32C from the rear to lock the first terminals 31A to 31C from the rear. The first locking tubes include two upper first locking tubes 73A that are inserted into the upper first terminal accommodating portions 32A, two middle first locking tubes 73B that are inserted into the middle first terminal accommodating portions 32B, and a lower first locking tube 73C that is inserted into the lower first terminal accommodating portion 32C.

A left first contact piece 74A, an upper first contact piece 74B and a right first contact piece 74C are provided at the peripheral edge of the first retainer body 71 so as to be spaced 90° apart around the first retainer body 71. The left and right first contact pieces 74A and 74C are bilaterally symmetrical. The left first contact piece 74A projects leftward with the peripheral portion of the first fixed portion 72 on the left side as a starting point, and protrudes rearward from its front edge in the projecting direction. On the other hand, the right first contact piece 74C projects rightward with the peripheral portion of the first fixed portion 72 on the right side as a starting point, and protrudes rearward from its front edge in the projecting direction. Additionally, the upper first contact piece 74B protrudes rearward directly from the upper edge of the first retainer body 71.

Figure 5:
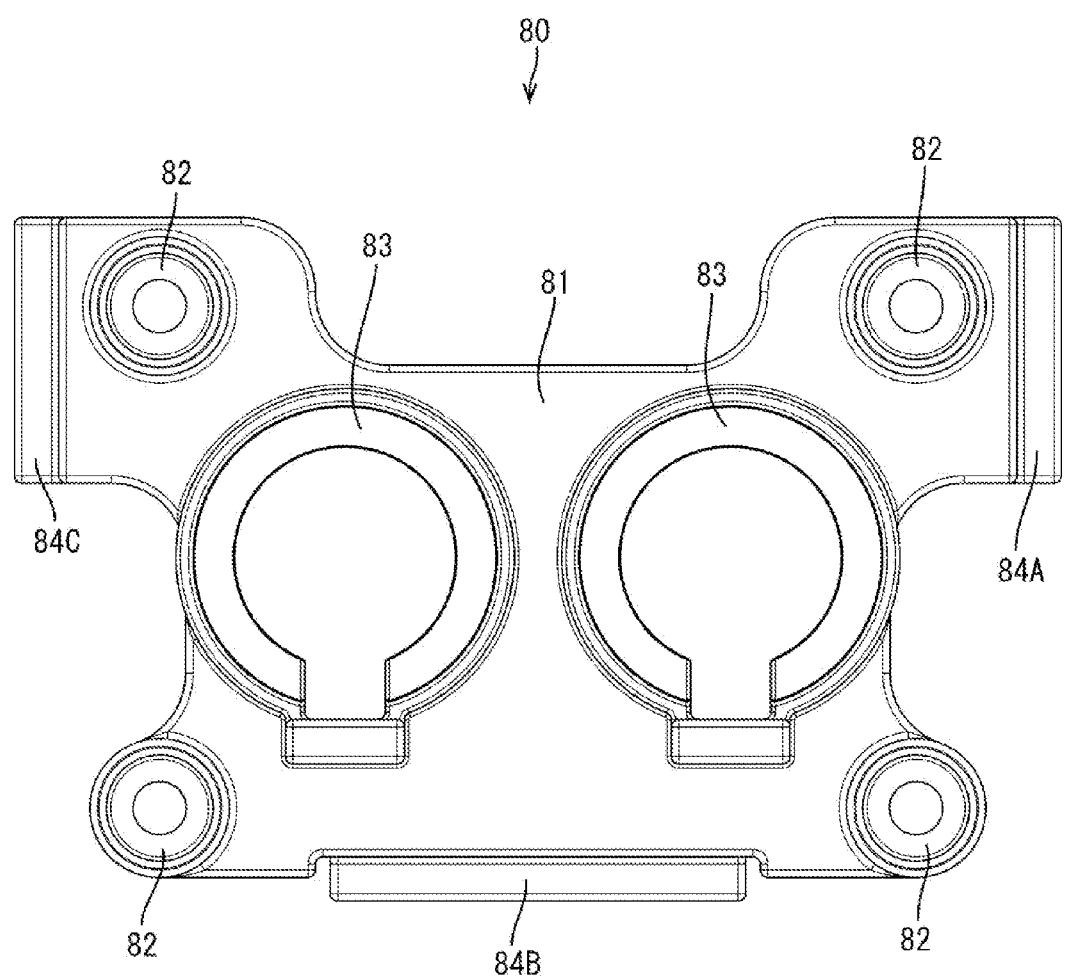
FIG. 5 is a front view of a second retainer.
Figure 6:
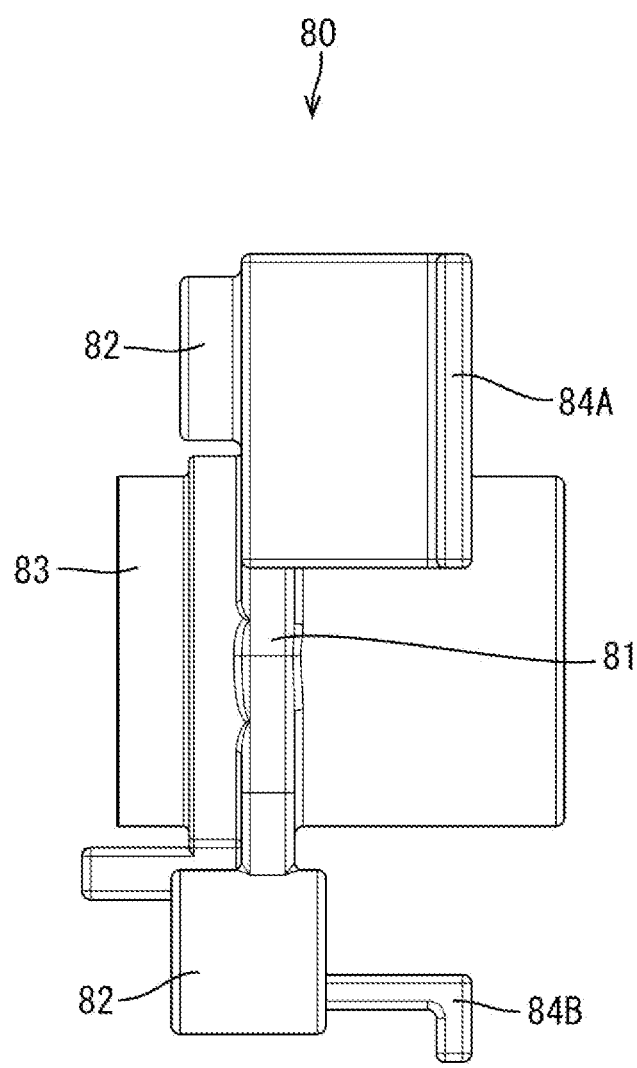
FIG. 6 is a side view of the second retainer.
Figure 7:
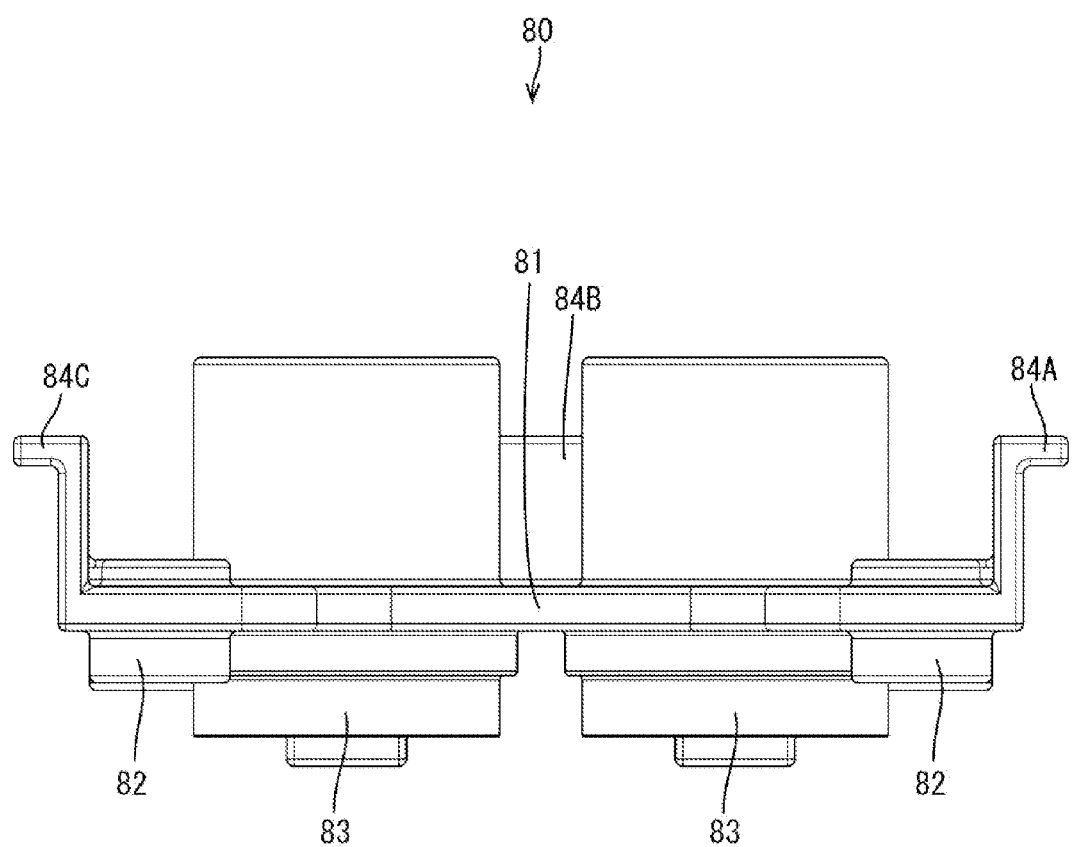
FIG. 7 is a plan view of the second retainer.

As shown in FIGS. 5 and 6, the second retainer 80 includes a second retainer body 81 that collectively retains the second terminals 41A and 41B, and second fixed portions 82 through which fastening members 25 are inserted. The second retainer body 81 has left and right second locking tubes 83 that are inserted into the left and right second terminal accommodating portions 42A and 42B from the rear to lock the left and right second terminals 41A and 41B from the rear.

A left second contact piece 84A, a lower second contact piece 84B, and a right second contact piece 84C are provided at the peripheral edge of the second retainer body 81 so as to be spaced 90° apart around the second retainer body 81. The left and right second contact pieces 84A and 84C are bilaterally symmetrical. The left second contact piece 84A projects slightly leftward with the peripheral portion of the upper-left second fixed portion 82 as a starting point, and protrudes rearward from its front edge in the projecting direction. On the other hand, the right second contact piece 84C projects slightly rightward with the peripheral portion of the upper-right second fixed portion 82 as a starting point, and protrudes rearward from its front edge in the projecting direction. Additionally, the lower second contact piece 84B protrudes rearward directly from the lower edge of the second retainer body 81.

Figure 11:
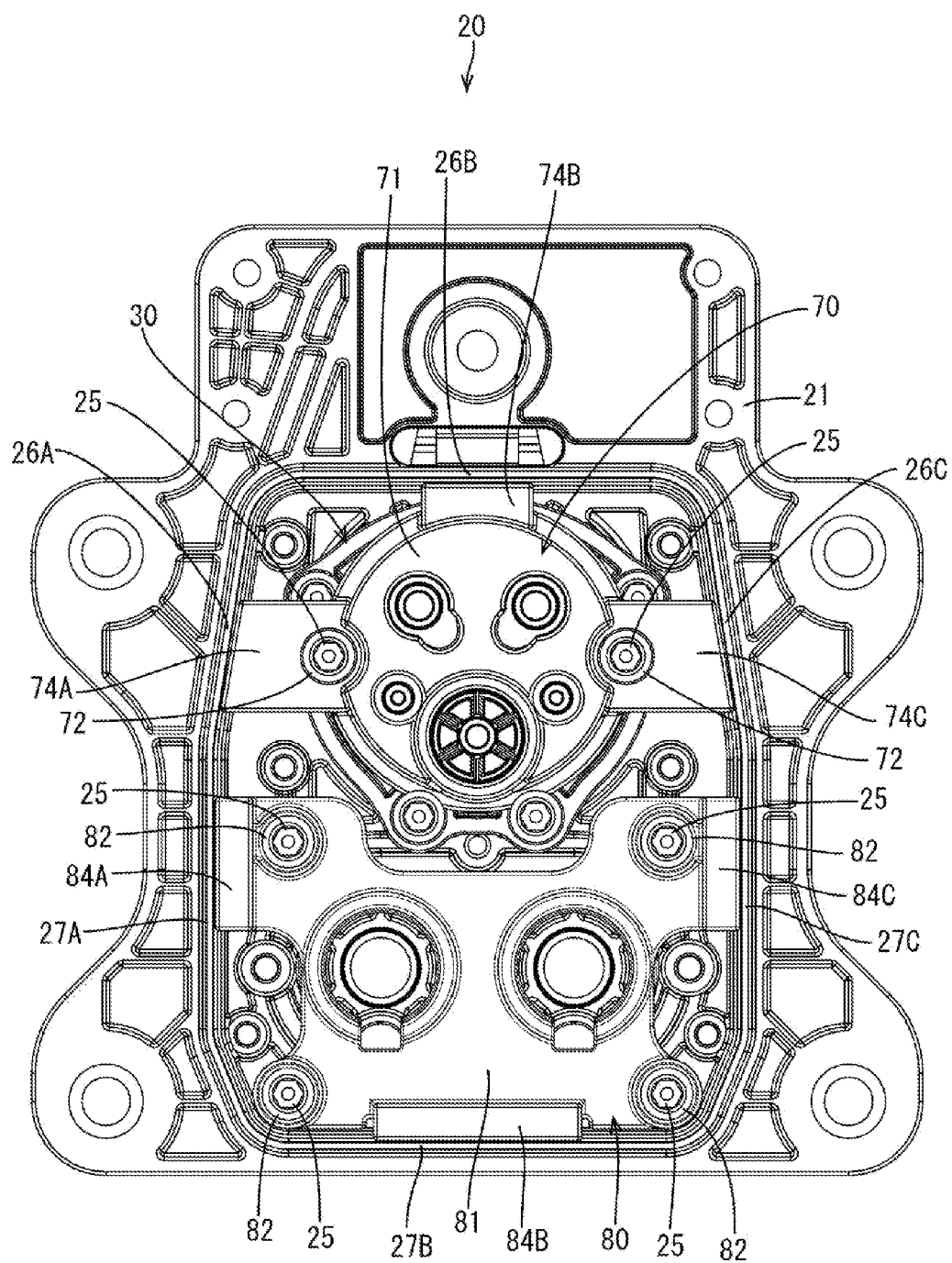
FIG. 11 is a rear view showing a state in which the first retainer and the second retainer are fixedly mounted to the inlet housing shown in FIG. 10.

As shown in FIG. 11, first peripheral walls 26A to 26C are disposed around the first retainer body 71 and stand upright on the mounting plate 21 of the inlet housing 20. Likewise, second peripheral walls 27A to 27C disposed around the second retainer body 81 stand upright on the mounting plate 21 of the inlet housing 20.

When the first retainer 70 is mounted to the back of the first connector fitting portion 30, the left first contact piece 74A contacts the first peripheral wall 26A on the left side in the drawing, the upper first contact piece 74B contacts the first peripheral wall 26B on the upper side in the drawing, and the right first contact piece 74C contacts the first peripheral wall 26C on the right side in the drawing. Consequently, the first retainer 70 is positioned at a normal mounting position. Here, the normal mounting position refers to a position at which the first fixed portions 72 of the first retainer 70 coincide with the fastened portions 35 of the first connector fitting 30. In other words, the normal mounting position refers to a position at which the fastening members 25 that have been inserted through the first fixed portions 72 of the first retainer 70 can be fastened directly to the fastened portions 35 of the first connector fitting 30. Accordingly, the first fixed portions 72 are disposed between the fastening members 25 and the fastened portions 35, and the first retainer 70 is mounted fixedly to the first connector fitting 30.

When the second retainer 80 is mounted to the back of the second connector fitting 40, the left second contact piece 84A contact the second peripheral wall 27A on the left side in the drawing, the lower second contact piece 84B contacts the second peripheral wall 27B on the lower side in the drawing, and the right second contact piece 84C contacts the second peripheral wall 27C on the right side in the drawing. Consequently, the second retainer 80 is positioned at a normal mounting position. Here, the normal mounting position refers to a position at which the second fixed portions 82 of the second retainer 80 coincide with the fastened portions 24 of the inlet housing 20. In other words, the normal mounting position refers to a position at which the fastening members 25 that have been inserted through the second fixed portions 82 of the second retainer 80 can be fastened directly to the fastened portions 24 of the inlet housing 20. Accordingly, the second fixed portions 82 are disposed between the fastening members 25 and the fastened portions 24, and the second retainer 80 is mounted to the inlet housing 20 fixedly.

Note that, in FIG. 9, the first peripheral walls 26A to 26C and the second peripheral walls 27A to 27C are connected with each other via coupling walls 28 to define an annular shape. For example, the two adjacent first peripheral walls 26A and 26B are coupled via a coupling wall 28, and the two adjacent first peripheral walls 26A and 27A are coupled via a coupling wall 28. The same applies to the other coupling walls 28, and therefore, the description thereof has been omitted here.

The first terminals 31A to 31C have round bar shapes with annular locking collars 37A to 37C provided around the outer peripheries thereof. When the first retainer 70 is mounted to the first connector fitting 30 from the rear, the front ends of the first locking tubes 73A to 73C of the first retainer 70 move closer to the locking collars 37A to 37C from the rear. The fastening members 25 then are inserted through the first fixed portions 72 of the first retainer 70 from the rear, and fastened to the fastened portions 35 of the first connector fitting 30.

Thus, the direction in which the first retainer 70 is mounted to the first connector fitting 30 and the direction in which the locking collars 37A to 37C are locked by the front ends of the first locking tubes 73A to 73C are both from the rear toward the front, and are the same. This eliminates the need to make sure that the first fixed portions 72 abut against the fastened portions 35 by setting the first fixed portion 72 to be larger in the front-rear direction in consideration of the form tolerance between the first connector fitting 30 and the first retainer 70. As long as the first fixed portions 72 coincide with the fastened portions 35, the first retainer 70 can be fixed reliably to the first connector fitting 30.

Specifically, two cases are possible for completing fastening the fastening members 25: a case where the fastening of the fastening members 25 is completed by the first fixed portions 72 abutting against the fastened portions 35, and a case where the fastening of the fastening members 25 is completed by the front ends of the first locking tubes 73A to 73C abutting against the locking collars 37A to 37C. However, neither of these cases poses a problem because the first retainer 70 is fixed to the first connector fitting 30 in a state in which the fastening of the fastening member 25 has been completed and an axial force has been generated.

The second terminals 41A and 41B each have a round bar shape, and annular locking collars 43A and 43B are provided around the outer peripheral surface thereof. When the second retainer 80 is mounted to the mounting plate 21 of the inlet housing 20 from the rear, the front ends of the second locking tubes 83 of the second retainer 80 move closer to the locking collars 43A and 43B from the rear. Next, the fastening members 25 are inserted through the second fixed portions 82 of the second retainer 80, and fastened to the fastened portions 24 of the inlet housing 20.

Thus, the direction in which the second retainer 80 is mounted to the inlet housing 20 and the direction in which the locking collars 43A and 43B are locked by the front ends of the second locking tube 83 are both a direction from the rear toward the front, and are the same. This eliminates the need to ensure that the second fixed portions 82 abut against the fastened portions 24 by making the second fixed portion 82 larger in the front-rear direction in consideration of the tolerance between the inlet housing 20 and the second retainer 80. As long as the second fixed portions 82 coincide with the fastened portions 35, the second retainer 80 can be fixed reliably to the mounting plate 21 of the inlet housing 20.

Two cases are possible for completing fastening of the fastening members 25: a case where fastening is completed by abutting the second fixed portions 82 against the fastened portions 24, and a case where fastening is completed by abutting the front ends of the second locking tubes 83 against the locking collars 43A and 43B. However, neither of these cases poses a problem because the second retainer 80 is fixed to the inlet housing 20 where the fastening of the fastening members 25 has been completed and an axial force has been generated.

As described above, the fixed portion 72 (82) is fixed to the inlet housing 20 by fastening the fastening member 25 to the fastened portion 24 (35). Thus, the retainer (the first retainer 70, the second retainer 80) is fixed to the inlet housing 20 by fastening the fastening member 25, and therefore, there will be no need for a conventional claw-shaped long lock, making it possible to reduce the overall profile of the charging inlet 10.

The direction in which the retainer body (the first retainer body 71, the second retainer body 81) locks the vehicle-side terminal (the first terminals 31A to 31C, the second terminals 41A and 41B) and the direction in which the fastening member 25 is fastened to the fastened portion 24 (35) may be the same.

With this configuration, the vehicle-side terminal is locked by the retainer body as a result of the fastening member 25 being fastened to the fastened portion. Here, depending on the form tolerance between the inlet housing 20 and the retainer, two cases are possible, namely, a case where fastening the fastening member 25 is completed in a state in which the retainer body abuts against the vehicle-side terminal, and a case where the fastening of the fastening member 25 is completed in a state in which the fixed portion 72 (82) abuts against the fastened portion 24 (35). In either case, the retainer is fixed to the inlet housing 20, and it is therefore not necessary to set the fixed portion 72 (82) to be larger in consideration of the above-described form tolerance.

Peripheral walls (the first peripheral wall 26A to 26C, the second peripheral wall 27A to 27C) disposed around the retainer body may stand upright on the back of the inlet housing 20, and a plurality of contact pieces (first contact piece 74A to 74C, second contact piece 84A to 84C) contact the peripheral walls from the side of the terminal accommodating portion (first terminal accommodating portion 32A to 32C, the second terminal accommodating portion 42A, 42B) may be provided at a peripheral edge of the retainer body. With this configuration, the retainer can be positioned at the inlet housing 20 to bring the contact pieces into contact with the peripheral walls. That is, with a conventional fixing method using a claw-shaped lock, the positioning of the retainer can be achieved by fitting the lock along the outer peripheral surface of the terminal accommodating portion. By using, as an alternative structure, a configuration in which the plurality of contact pieces are brought into contact with the plurality of peripheral walls, the fixing method using the fastening member 25 can also achieve the positioning in the same manner as the conventional method.

Some of contact pieces may project toward the peripheral wall with the fixed portion 72 (82) as a starting point. With this configuration, the fixed portion 72 (82) and the peripheral wall are directly connected with the contact piece, making it possible to increase the accuracy of positioning the fixed portion 72 (82) at the fastened portion 24 (35).

The contact pieces may be spaced 90° apart around the terminal accommodating portion. With this configuration, the retainer body can be positioned from directions that differ by 90° around the terminal accommodating portion. As a result, the accuracy of positioning the fixed portion 72 (82) at the fastened portion 24 (35) can be increased.

The charging inlet 10 may include a coupling wall 28 that couples an adjacent pair of the peripheral walls. With this configuration, the plurality of peripheral walls can be formed integrally by the coupling wall 28, making it possible to increase the strength of the peripheral walls.

The technology disclosed herein is not limited to the embodiment described above by way of the description and the drawings, and includes, for example, various embodiments as follows.

Although the first connector fitting 30 is formed separately from the mounting plate 21 of the inlet housing 20 in the above-described embodiment, it is possible to adopt an inlet housing 20 in which the first connector fitting is integral with the mounting plate.

In the above-described embodiment, the fastening member 25 are bolts, and the fastened portions 24 and 35 are nuts. However, the fastened portions may be bolts, and the fastening members may be nuts.

Although the fastening members 25 are fastened to the fastened portions 24 and 35 from the rear in the above-described embodiment, the fastening members may be fastened to the fastened portions in the up-down direction or the left-right direction.

Although the retainers are positioned by bringing the contact pieces into contact with the inner side of the peripheral walls in the above-described embodiment. However, the contact pieces may be brought into contact with the outer surface of the peripheral walls. Alternatively, the retainers may be positioned by fitting projections into holes.

Although two adjacent peripheral walls are coupled by a coupling wall in the above-described embodiment, no coupling wall may be provided.

LIST OF REFERENCE NUMERALS

10 charging inlet
20 inlet housing
24 fastened portion
25 fastening member
26A-26C first peripheral wall
27A-27C second peripheral wall
28 coupling wall
31A upper first terminal
31B middle first terminal
31C lower first terminal
32A upper first terminal accommodating portion
32B middle first terminal accommodating portion
32C lower first terminal accommodating portion
35 fastened portion
41A left second terminal
41B right second terminal
42A left second terminal accommodating portion 42B right second terminal accommodating portion
70 first retainer
71 first retainer body
72 first fixed portion
74A left first contact piece
74B upper first contact piece
74C right first contact piece
80 second retainer
81 second retainer body
82 second fixed portion
84A left second contact piece
84B lower second contact piece
84C right second contact piece

What is claimed is:

1. A charging inlet, comprising:
   an inlet housing including at least one fastened portion;
   a terminal accommodating portion provided in the inlet housing and having a rearward-facing opening;
   a vehicle-side terminal accommodated in the terminal accommodating portion through the rearward-facing opening;
   a retainer includes having a retainer body that is locked to the vehicle-side terminal from a rear direction, and at least one fixed portion with a through hole provided therein; and
   at least one fastening member extending through the through hole in the at least one fixed portion of the retainer from the rear direction and fastened to the fastened portion of the inlet housing for fastening the retainer to the inlet housing.

2. The charging inlet of claim 1, further comprising peripheral walls standing upright on a back of the inlet housing and disposed around the retainer body, and contact pieces provided at a peripheral edge of the retainer body and contacting the peripheral walls from a side of the terminal accommodating portion and thereby aligning the through hole of the fixed portion with the at least one fastened portion of the inlet housing.

3. The charging inlet of claim 2, wherein the contact pieces include a contact piece projecting towards one of the peripheral walls with the fixed portion as a starting point.

4. The charging inlet of claim 2, wherein the contact pieces are spaced 90° apart around the terminal accommodating portion.

5. The charging inlet of claim 2, further comprising a coupling wall that couples an adjacent pair of the peripheral walls.

* * * * *